May 8, 1956 — U. TORRICELLI — 2,744,520
MACHINE FOR TESTING REFLEX ACTION OF HUMANS
Filed April 5, 1951 — 7 Sheets-Sheet 1

INVENTOR.
UGO TORRICELLI
BY L. S. Saulsbury
ATTORNEY

May 8, 1956 U. TORRICELLI 2,744,520
MACHINE FOR TESTING REFLEX ACTION OF HUMANS
Filed April 5, 1951 7 Sheets-Sheet 2
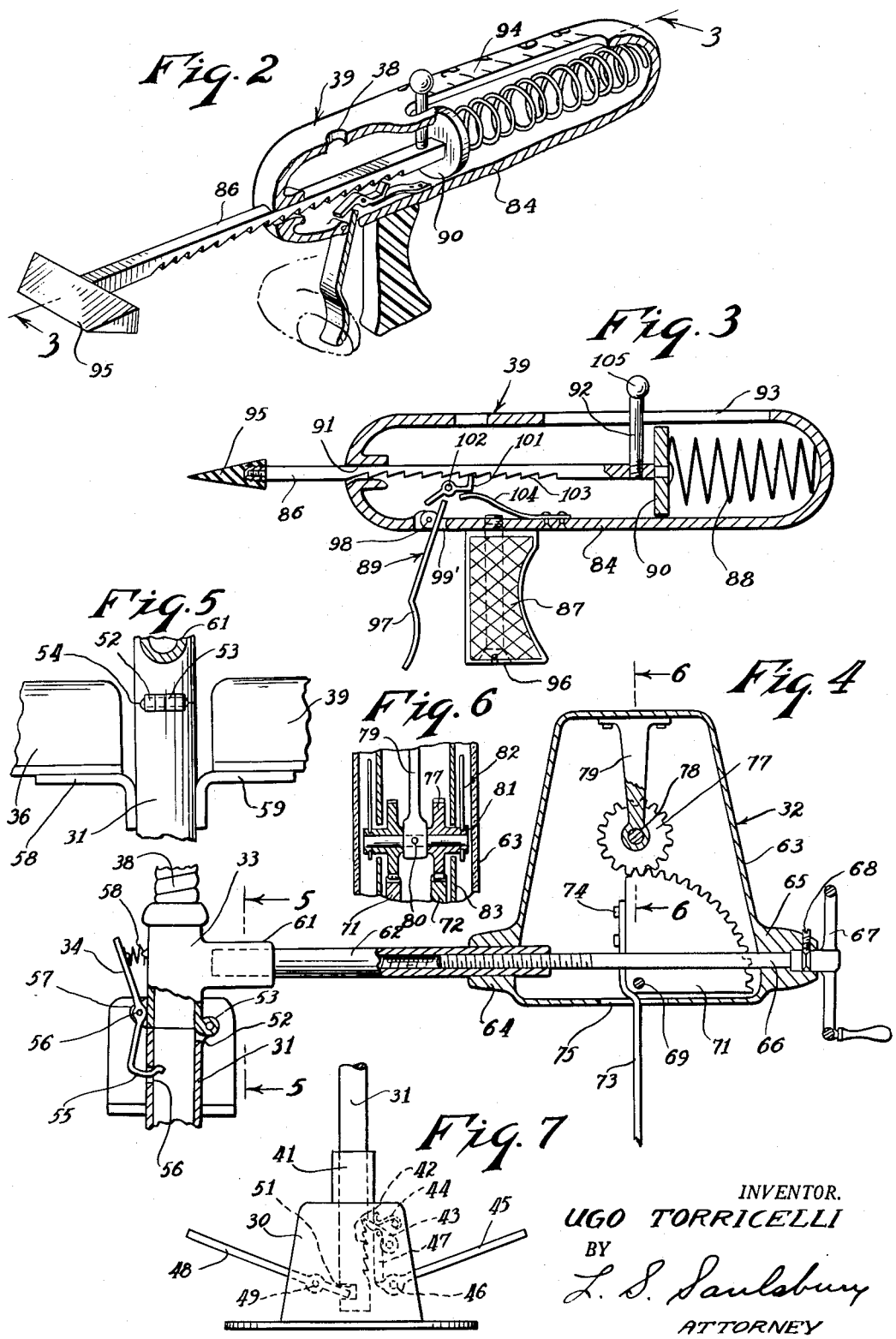
INVENTOR.
UGO TORRICELLI
BY
L. S. Saulsbury
ATTORNEY

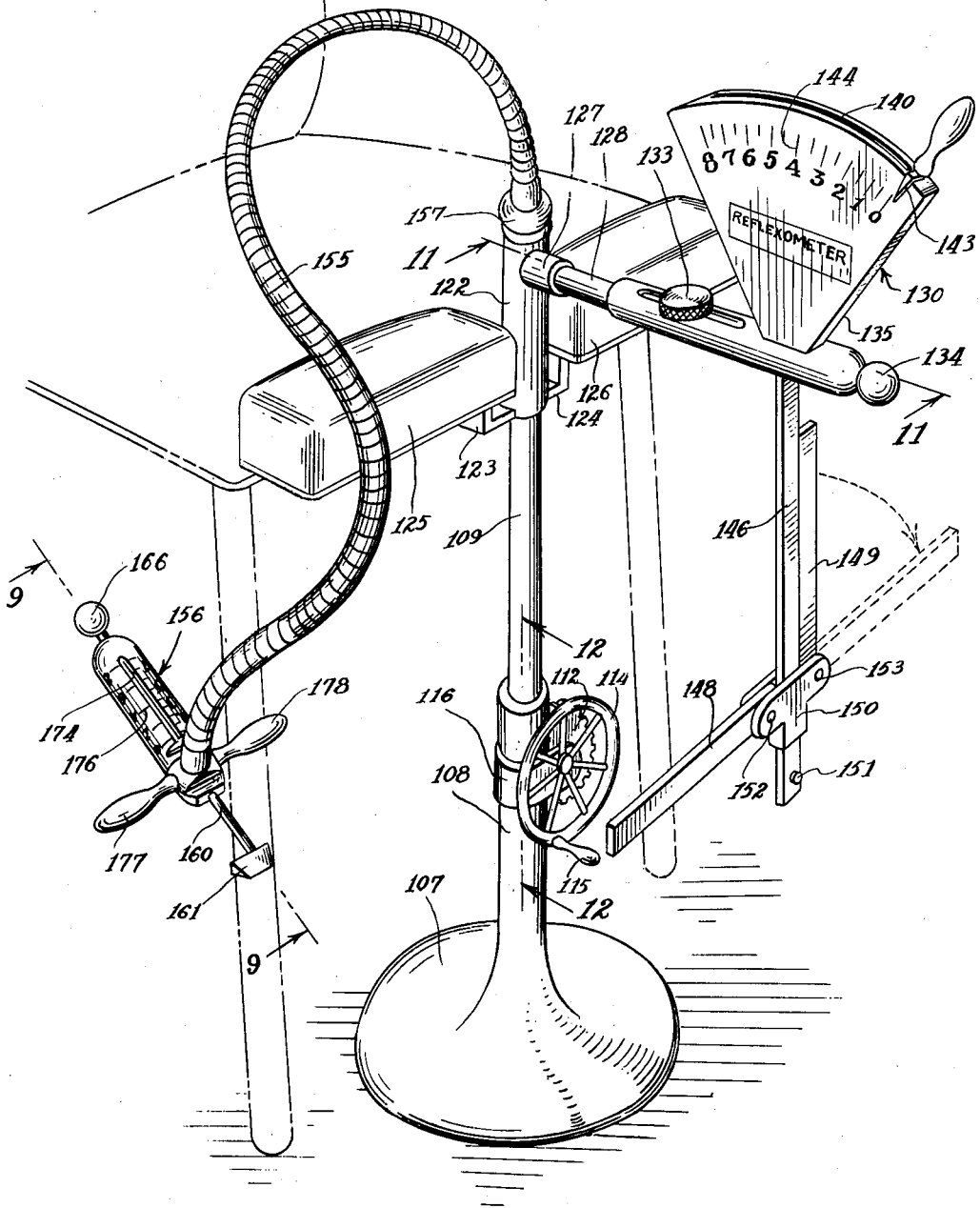

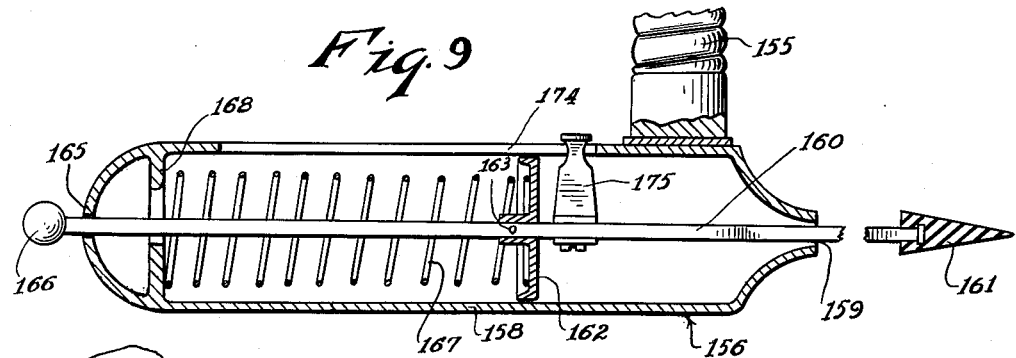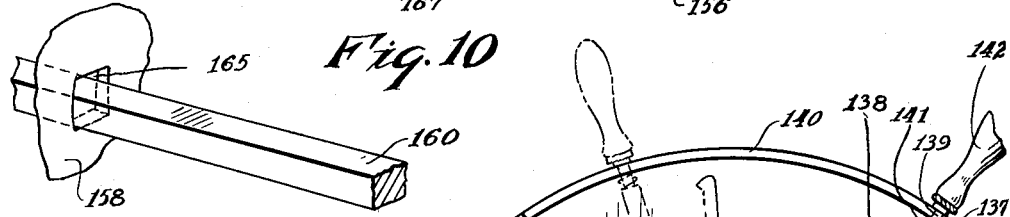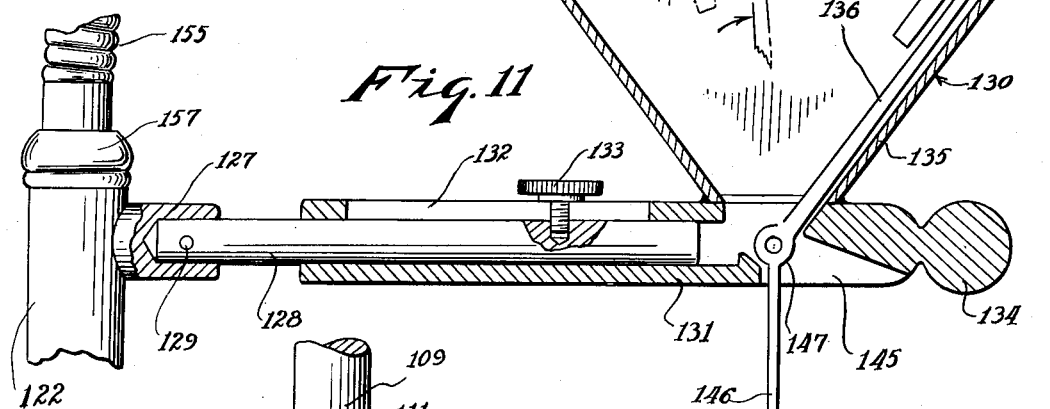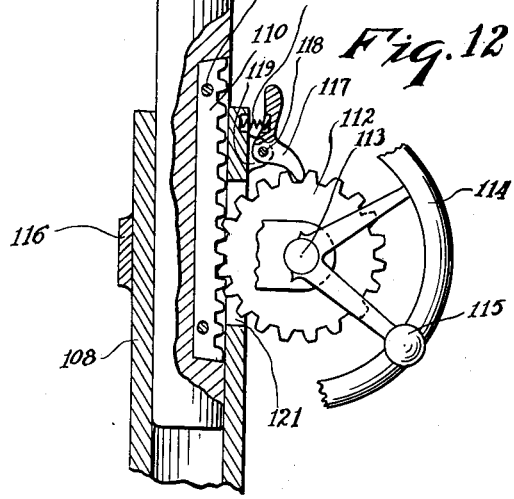

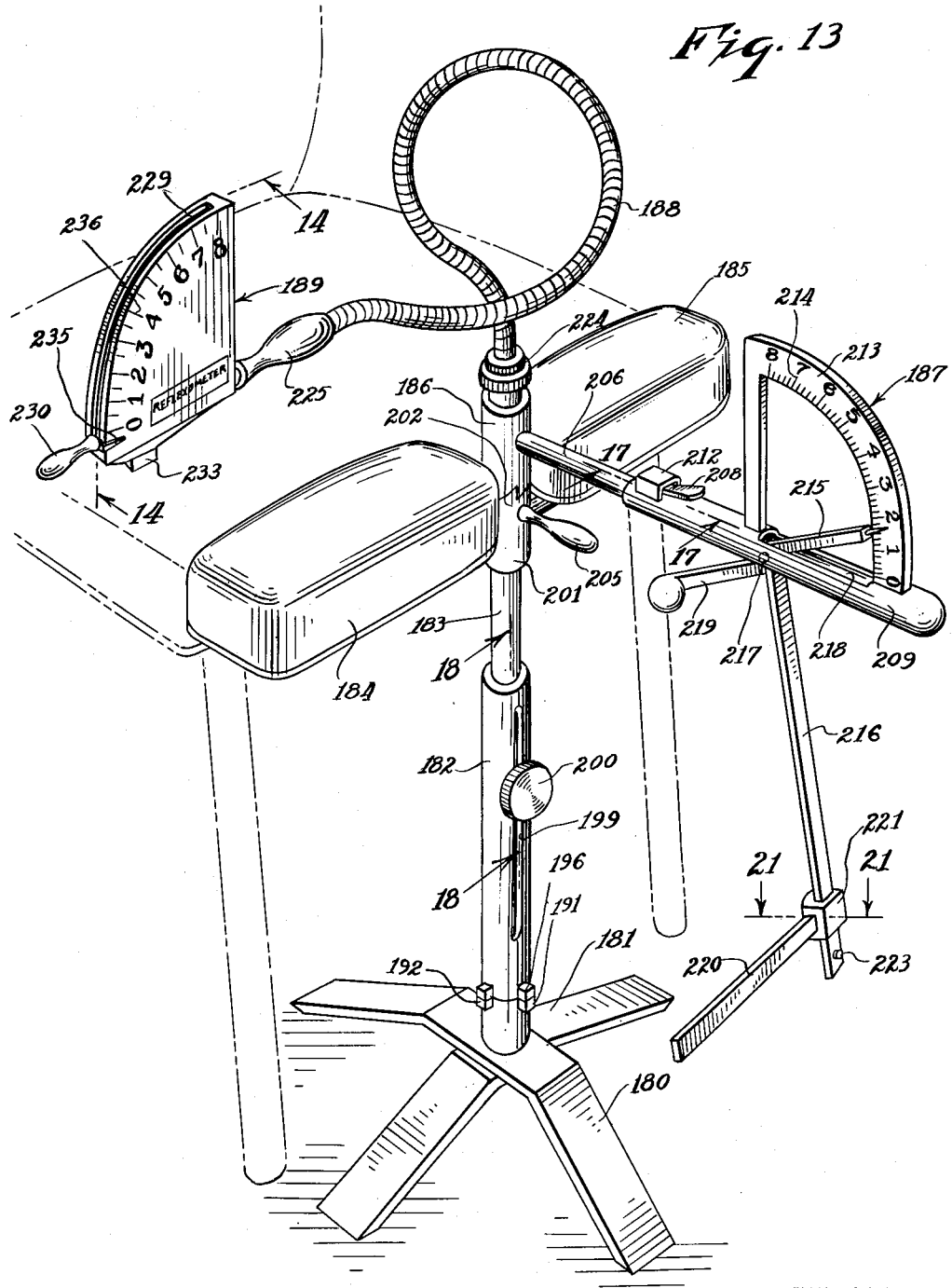

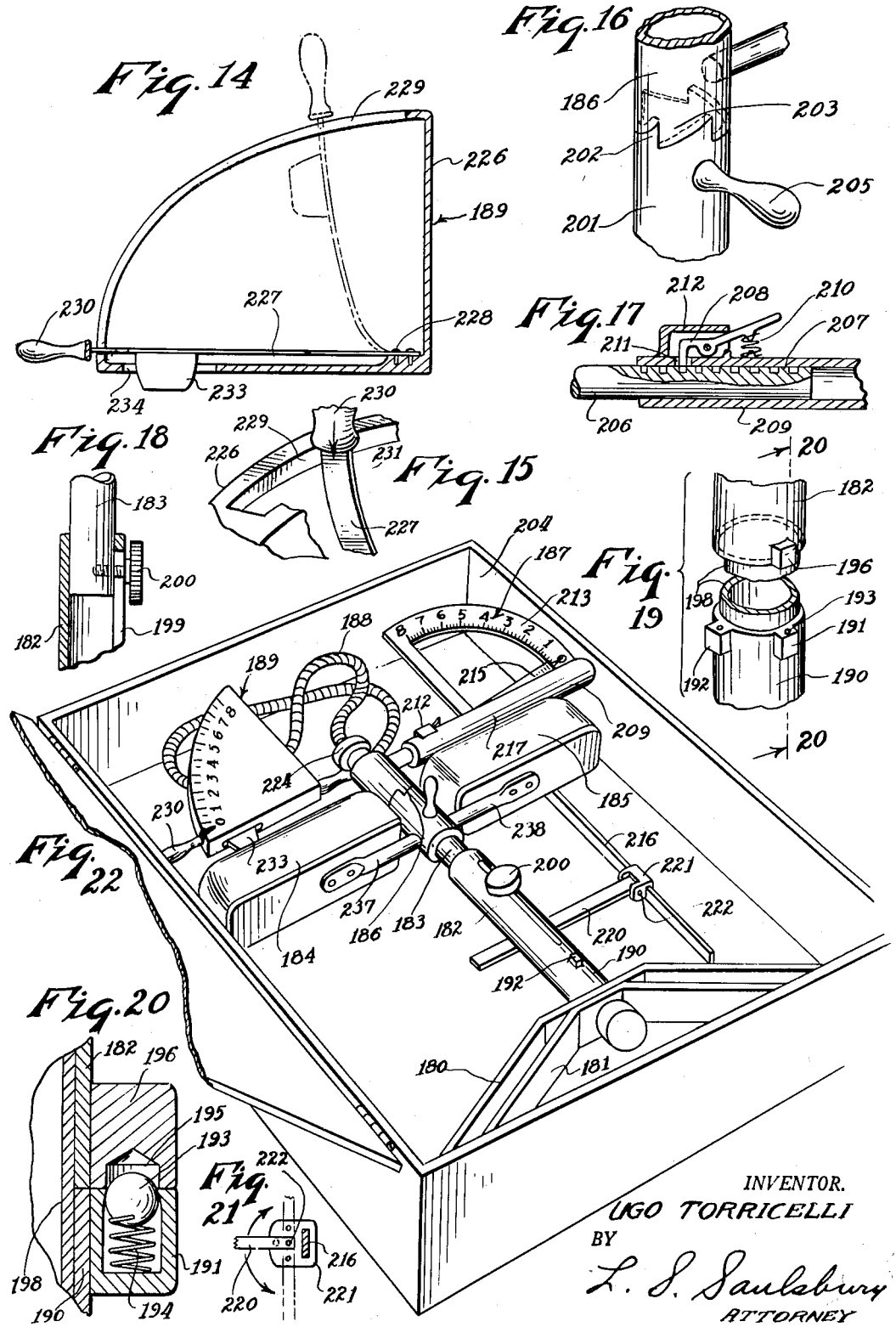

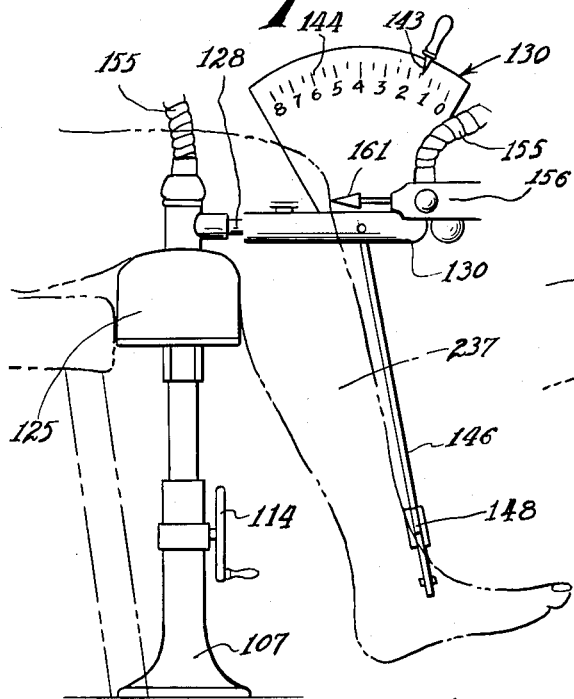
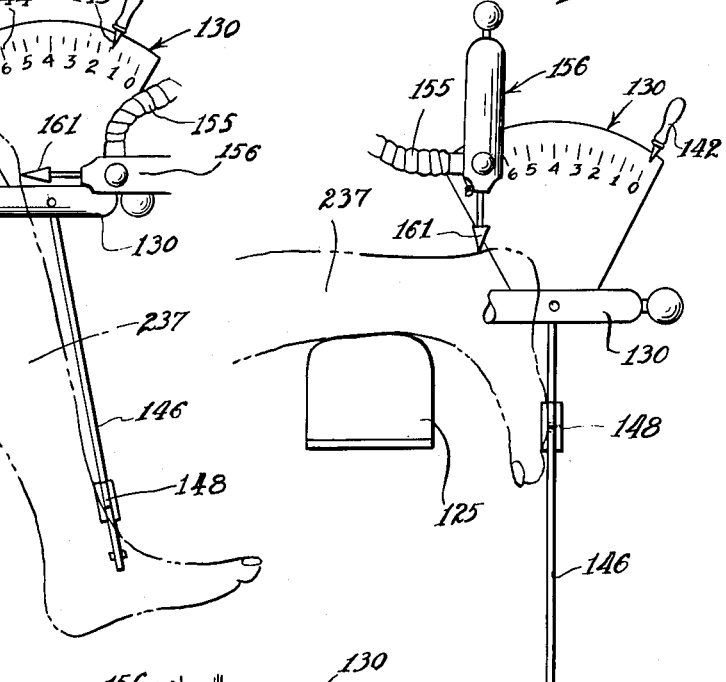
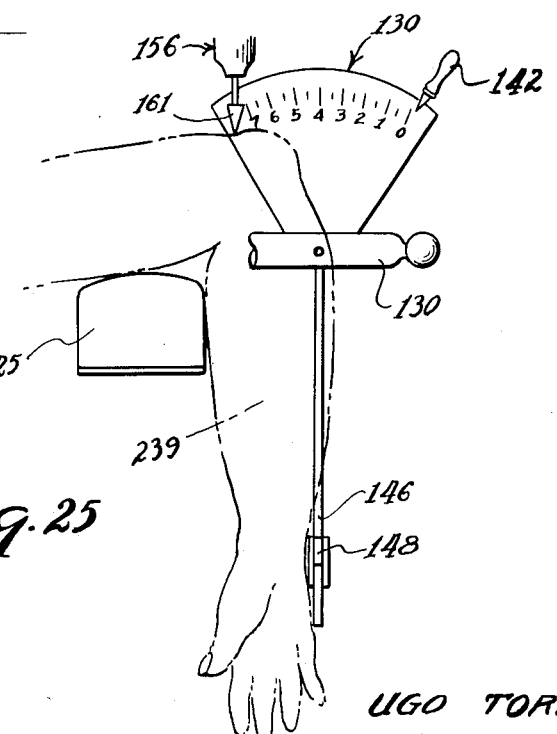

United States Patent Office 2,744,520
Patented May 8, 1956

2,744,520

MACHINE FOR TESTING REFLEX ACTION OF HUMANS

Ugo Torricelli, New York, N. Y., assignor to Torricelli Creations, Inc.

Application April 5, 1951, Serial No. 219,492

10 Claims. (Cl. 128—2)

This invention relates to a machine for testing and measuring the reflex action of limb joints of humans.

It is an object of the present invention to provide a reflex action testing and measuring machine which is adaptable for use in testing either a leg, foot, or forearm and wherein the parts of the machine are adjustable for different sizes of legs, feet or forearms, as these vary with different persons.

It is another object of the invention to provide a reflex action testing and measuring machine with means for comfortably supporting the leg, foot or arm being tested and wherein the striking device is carried by such means, is adapted to be brought into proper position readily by the operator to strike the limb and is movable readily from one limb to the other.

It is another object of the invention to provide a reflex action testing and measuring machine which is adapted to support two legs or both feet simultaneously so that removal of one of the legs or one of the feet is unnecessary in the machine, and whereby the readings of the two legs or both feet can be taken without repositioning them in the machine and by a simple movement of the striking device from one leg to the other or from one foot to the other and wherein the readings of the amount of reflex action can be taken without rearrangement of arms which are contacted by the limb and operate the measuring device.

It is another object of the invention to provide a reflex action testing and measuring machine wherein the principal parts thereof can be aligned in one plane so that the machine can be placed in a carrying case and whereby the adjustment of the parts into or out of the common plane can be effected easily and readily and without disengagement of the parts, one from the other.

Other objects of the invention are to provide a reflex action testing machine for humans which is of simple construction, inexpensive to manufacture, light in weight and portable, self-contained, has a minimum number of parts, is compact and easy to set up and adjust for the different sizes of limbs to be tested and has measuring indications for both the striking force and the measuring of the amount of reflex action and wherein there is a tell-tale member on the measuring device.

For a better understanding of the invention, reference may be had to the following detailed description taken in connection with the accompanying drawings, in which:

Fig. 2 is an enlarged perspective view of the striking gun with portions thereof cut away to show the interior construction thereof.

Fig. 3 is a longitudinal sectional view of the striking gun, taken generally on line 3—3 of Fig. 2.

Fig. 4 is a fragmentary and longitudinal sectional view illustrating the measuring portion of the machine and taken generally on line 4—4 of Fig. 1.

Fig. 5 is a fragmentary elevational view, looking upon the hinged pedestal parts, as viewed generally on line 5—5 of Fig. 4.

Fig. 6 is an enlarged fragmentary sectional view of the gearing of the measuring device from which both right and left readings can be taken without readjustment of the arrangement of the arms contacting the limbs and as viewed generally on line 6—6 of Fig. 4.

Fig. 7 is a fragmentary elevational view of the supporting base for the form of the invention shown in Fig. 1, and illustrating mechanism for effecting raising and lowering of the pedestal parts by means of foot levers.

Fig. 8 is a perspective view of a modified form of the invention, utilizing different striking and measuring devices and adjusting mechanism for the pedestal support.

Fig. 9 is a longitudinal sectional view of the striking device taken on line 9—9 of Fig. 8.

Fig. 10 is a fragmentary perspective view of parts of the striking device of Fig. 9.

Fig. 11 is a longitudinal sectional view taken through the measuring device and generally on line 11—11 of Fig. 8.

Fig. 12 is a fragmentary sectional view taken through the adjusting mechanism for the pedestal support and generally on line 12—12 of Fig. 8.

Fig. 13 is a perspective view of a still further form of the invention and of a testing machine which can have its parts moved into a common plane for the purpose of being fitted into a carrying case.

Fig. 14 is a longitudinal sectional view taken through the striking device used with the form of the invention shown in Fig. 13 and generally on line 14—14 of Fig. 13.

Fig. 15 is a fragmentary perspective view of parts of the striking device.

Fig. 16 is a fragmentary view of the pedestal parts of the device which permit the adjustment of the measuring device between two positions.

Fig. 17 is a fragmentary sectional view taken generally on line 17—17 of Fig. 13 and showing the adjusting feature of the measuring device upon the rod support therefor.

Fig. 18 is a fragmentary sectional view of the pedestal parts and taken generally on line 18—18 of Fig. 13.

Fig. 19 is a fragmentary collective and perspective view of certain of the pedestal parts and the detent projections for holding the parts, and more particularly the base parts, either parallel to one another or in an extended and angular position relative to one another.

Fig. 20 is an enlarged sectional view of the detent means used with the pedestal feet and taken generally on line 20—20 of Fig. 19.

Fig. 21 is a transverse sectional view taken through the adjustable contact arm for the measuring device shown in Fig. 13 and generally on line 21—21 thereof.

Fig. 22 is a perspective view of the carrying case and of the testing machine shown in Fig. 13 collapsed so that the parts are generally in a common plane and disposed within the carrying case.

Fig. 23 is a side elevational view of the testing machine and illustrating the manner in which the legs of the patient are disposed therein.

Fig. 24 is a fragmentary elevational view of one of the machines and illustrates the manner in which a foot is tested therein and Fig. 25 is a fragmentary elevational view of one of the machines and illustrates the manner in which a forearm is tested therein.

Figure 1:
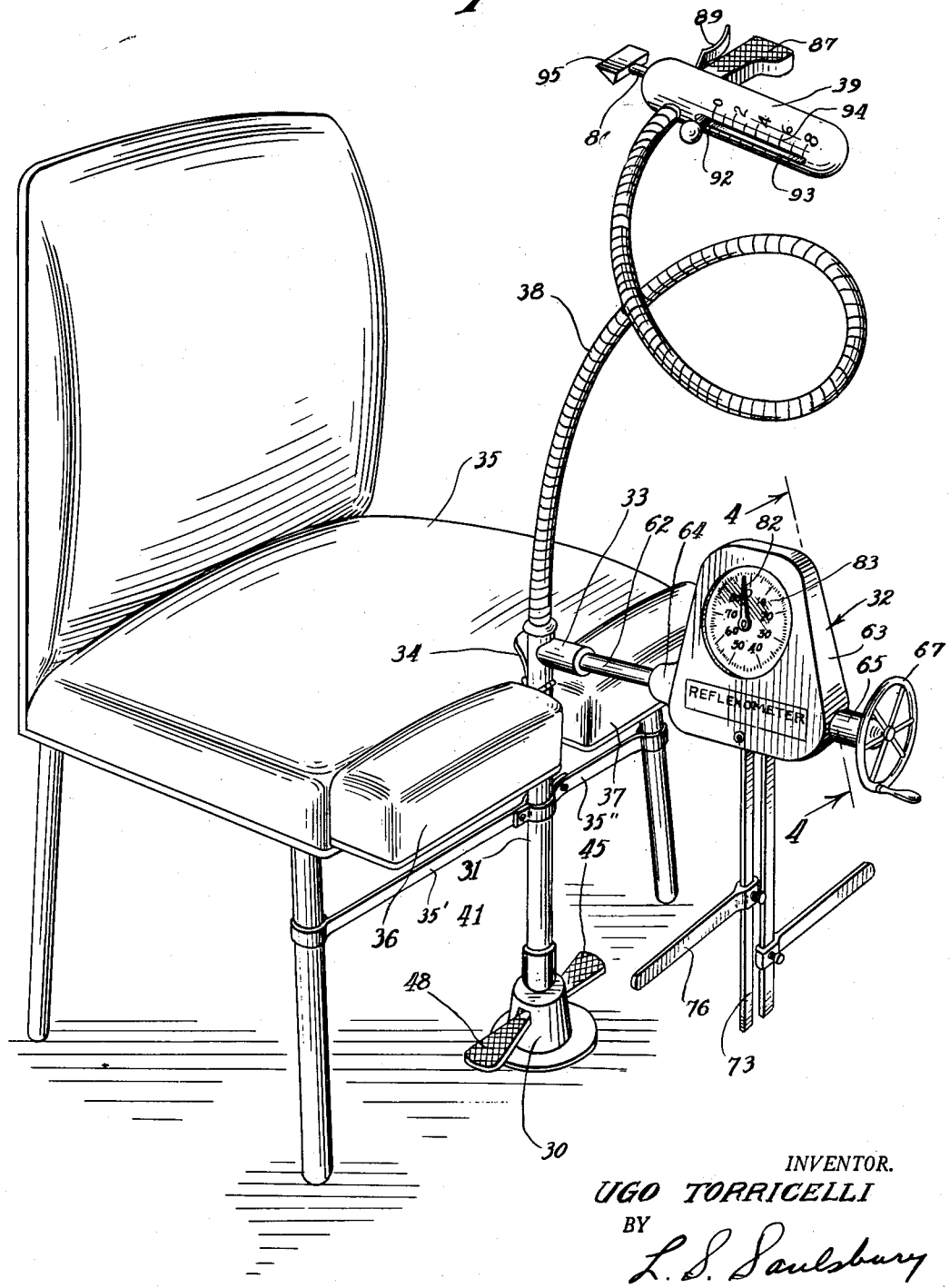
Fig. 1 is a perspective view of a reflex action testing machine, according to one form of the invention, having limb supports thereon adjustable with parts of the machine to the different chair heights and patient sizes.

Referring now particularly to Figures 1 to 7, wherein there is shown one form of the invention, a base 30 has an upstanding pedestal part 31 to a laterally extending hinged arm of which a measuring device 32 is connected. The hinged arm and the measuring device 32 are normally in laterally extended position and the hinge arrangement permits the measuring device to be temporarily lowered to make it easy for the patient to straddle the machine and become seated in chair 35. The pedestal member 31 has laterally extending limb supports 36 and 37 upon which the legs can be placed as the patient is seated in the chair 35, the pedestal 31 being attached to the chair legs by straps 35' and 35''.

The member 33 carries a flexible goose neck support 38 for a striking device 39. This striking device can be brought downwardly and positioned on either side of the measuring device 32 to effect a striking of the nerve on the limb of the patient.

The base 30 has an upwardly extending sleeve 41 in which the pedestal support rod 31 is adjustable. The lower end of the support rod 31 has ratchet teeth 42 engageable by a ratchet-holding element or pawl 43. A spring 44 holds the pawl 43 against the ratchet teeth 42. In order to release the pawl 43 a foot lever 45 is pivoted at 46 on the support 30 and acts through a lifting link 47 to lift the pawl 43 so that the pedestal support and the parts carried thereby can be lowered; to elevate the support rod 31, a foot lever 48 is pivoted at 49 upon the support 30, and enters a notch 51 in the lower end of the pedestal support rod 31. By applying foot pressure to the lever 48, the pedestal support rod can be lifted to any desired height depending upon the patient and the size of the chair 35. The pawl upon engaging a ratchet tooth 42 will hold the support rod 31 in the desired elevated position.

On the upper end of the pedestal support rod 31 is a hinge formation 52, Figs. 4 and 5, which cooperate with hinge formations 53 on the member 33. These formations are connected together by a hinge pin 54. Accordingly, the member 33 can be pivoted downwardly and forwardly and will take with it the devices supported thereon. The latch 34 has a hook 55 which enters a slot 56 in the upper end of the support 31 to hold the member 33 against downward pivotal movement and in a horizontal position upon the upper end of the pedestal support rod 31. The latch 34 is hinged at 56 to lug formations 57 on the member 33 and is held in latching position by a compression spring 58'.

The limb supporting members 36 and 37 which extend laterally from the support rod 31 are secured in position by bracket members 58 and 59, respectively.

The hinge support member 33 has a laterally extending socket projection 61, Fig. 4, in which is secured an internally threaded tubular lateral support arm 62 for the measuring device 32. The measuring device 32 comprises generally a casing 63 having opposite, aligned end enlargements 64 and 65. The enlargement 64 is slidable over the lateral arm support 62. An externally threaded adjusting screw 66 is journalled in the enlargement 65 with its threaded end extending into the internally threaded lateral support arm 62. A crank wheel 67 is provided on one end of the adjustable screw 66 by which the adjusting screw can be turned. A set screw 68 fixes the screw and the crank wheel against lateral displacement from the measuring device casing 63. Accordingly, as the screw 66 is adjusted by rotating it, the measuring device can be properly positioned with respect to the limb of the patient which is supported upon one of the lateral supports 36 and 37.

Pivoted about a pin 69 carried by the casing 63 are laterally spaced gear segments 71 and 72. An arm 73 depends from one side of each segment and is secured thereto by fastening screws 74, Fig. 4. This arm 73 depends through an opening 75 in the bottom of the casing 63. Adjustable upon each arm is a laterally extending contact member 76 which can be positioned to the proper elevation upon the arm, Fig. 1. The depending member 73 and its contact member 76 will be moved under the reflex action of the limb, and will accordingly pivot the segment 71. In mesh with each of the segments 71 and 72 is a small gear 77 that is pivoted upon a pin 78 carried by a depending bracket 79 mounted in the top of the casing 63, Figs. 4 and 6. This shaft 78 is held on the bracket 79 against axial displacement by a cotter pin 80.

Each gear 77 has a sleeve projection 81 with an indicating pointer 82 which is operable over a dial 83, provided upon the side of the casing 63, bearing measurement markings from zero to 100. It should be understood that the measuring device provides a separate measuring means for each limb and that there are two dials on the device, one at one side and one at the other, and from which the respective limbs which are simultaneously placed upon the limb supports 36 and 37 can be respectively measured for reflex action. The lateral contact arm 76 can be at any elevation, but at such elevation to give effective actuation of the measuring device. It will thus be apparent that a reading of both limbs can be taken without a rearrangement of the devices of the machine. It will be necessary only to take the striking device from one limb to the other and to observe the different dials on the measuring device 32.

The striking gun device 39 is easily accessible as it is mounted upon the goose neck member 38 that is fixed to the hinged member 33 and which can accordingly be easily manipulated and adjusted through the flexibility of the goose neck structure 38. The striking gun device 39 comprise generally a hollow elliptical casing 84 to which the goose neck 38 is secured. This casing 84 is provided with a striking rod 86, a handle 87 and a trigger release arrangement 89.

The casing 84 is closed at one end to retain the spring 88 and the striking rod 86 has a plate 90 against which the spring 88 reacts to urge the striking rod 86 forwardly through an opening 91 in the opposite end of the casing 84 upon being released by the trigger arrangement 89. An indicating member 92 extends upwardly from the rod 86 through an elongated slot 93, along one side of which are measuring indicia 94 so that a determinate or definite striking force can be applied. A striking element of soft material, as indicated at 95, is fixed at the forward end of the striking rod 86. This element 95 is shaped to be effective upon the nerve of the limb being struck.

The handle 87 is held fixed to the casing 84 by a screw bolt 96. The trigger arrangement 89 comprises a depending finger element 97 pivoted at 98 to operate in slot 99 of the casing 84.

A latch 101 is pivoted at 102 and is engageable with any one of the plurality of ratchet teeth 103 provided on the striking rod 86. This latch is normally held in engagement with one of the teeth 103 by the distal end of a leaf spring 104 secured to and extending upwardly from the bottom of the casing 84. The upper end of the finger element 97 is adapted to engage latch 101 to disengage the same from the ratchet teeth and against the action of the spring 104 to effect a release of the striking rod and of the compression spring 88. The arm 92 that extends through the slot 93 has a ball or knob formation 105 which can be grasped to cause the retraction of the striking rod 86 to any position along the indicia 94 on the casing 84 depending upon the amount of striking force desired in a given test.

Referring now particularly to Figs. 8 to 12, inclusive, there is shown a modified form of the invention wherein the hinged member 33 is dispensed with and different forms of striking and measuring devices and vertical adjusting mechanisms are employed. According to this form of the invention there is provided a pedestal base 107 having an upstanding sleeve projection 108 in which is vertically adjustable a support rod 109. The lower end of the support rod 109 has a toothed gear rack 110 fixed therein by pins 111, Fig. 12, and with which an adjusting gear wheel 112 is meshed. This gear wheel 112 is fixed to a pin 113 which is turned by a crank wheel 114 having a knob 115. The pin 113 is supported on a U-shaped bracket 116 on the sleeve projection 108.

A latch 117 is pivoted on a pin 118 upon lugs 119 extending from the side of the upstanding projection 108 of the base support. A compression spring 120 normally urges the latch 117 into engagement with the teeth of the adjusting gear wheel 112. The gear wheel 112 extends through slot 121 for engagement with the rack 110, this slot being in the projection 108 of the base support.

Upon the upper end of the adjustable support member 109 is a sleeve 122, Figs. 8 and 11, to the lower end of which are secured the lateral angle brackets 123 and 124 which carry, respectively, laterally extending limb supporting cushions 125 and 126. A socket projection 127 extends laterally from the sleeve 122 and receives and supports one end of a laterally extending arm 128 which is fixed in position by a pin 129.

A measuring device 130 is supported upon this laterally extending arm 128. This measuring device 130 has a sleeve member 131 that is slidably adjustable upon the arm 128. This sleeve member has an elongated slot 132 through which an adjusting or retaining screw 133 extends for threaded engagement with the arm 128. This screw serves to clamp the measuring device at any desired laterally adjusted position. A knob 134 is provided on the sleeve 131 as a handle by which the device 130 can be pulled or pushed for adjusting purposes when the clamping screw 133 is released.

A segmental casing formation 135 extends upwardly from the sleeve 131 and contains a measuring arm 136 that engages through its pointed projection 137 a movable indicating member 138. This member 138 has a portion 139 of reduced diameter and extends outwardly through slot 140 and about which is a spring 141 that thus holds the member 138 firmly against the inner surface of the casing 135 and in the position to which it has been moved by the indicating arm 136. A handle member 142 is fixed to the member 138, and is used to bring the member 138 back to the zero position after it has been advanced by the arm 136. The handle member 142 carries an indicating pointer 143 which moves over the numerical indicia or scale 144 on the side of the casing 135 of the measuring device.

A working arm depends downwardly through an opening 145 in the sleeve support 131. This arm is indicated at 146 and is integral or unitary with the indicating arm 136 to move the same. The combined arms are pivoted upon a pin 147 in the opening 145, Fig. 11.

Adjustable upon the depending arm 146 are laterally extending arms 148 and 149 which are pivotally mounted in a T-head 150, which is frictionally retained on the depending arm 146 at the elevation to which it is adjusted. A stop pin 151 prevents the disassembly of the head 150 from the lower end of the arm 146.

The arms 148 and 149 are respectively pivotally connected to the adjustable head 150 by pins 152 and 153. These arms can be elevated, as shown in Fig. 8, or they can be extended one at a time to operate upon the desired limb at the respective sides of the machine. First one arm can be lowered for one limb to strike and then the other arm can be lowered for the other limb to strike. The indicator 143 will remain as shown in Fig. 11 at the position to which it has been taken by the indicating arm 136. A reading can then be taken at the convenience of the operator with the assurance of obtaining an accurate measurement.

Fixed to the upper end of the sleeve member 122 is a flexible goose neck 155 which carries a striking device 156 at its free end. A special cap element or ferrule 157 may be used for the securement of the goose neck to the sleeve 122.

The striking device 156 comprises generally a casing 158 having a reduced opening at its forward end, as indicated at 159, through which a striking rod 160 is adjustable. This striking rod carries a tapered cushion element 161 adapted to engage with the limb of the patient. Within the casing 158 is a plunger plate 162 fixed to the rod 160 by a pin 163. This rod 160 projects outwardly through an opening 165 in the rear end of the casing 158. A knob 166 is fixed to the outer end of the rod 160 by which the rod can be retracted and pulled rearwardly against the action of a compressing spring 167 that engages the plate 162 and reacts against the partition 168 in the rear end of the casing 158.

When it is desired to release the rod 160 to effect a blow upon the limb of the patient, the knob 160 and the rod is pulled through the slot 165 and then released. Under the action of spring 167 acting on plate 162, the rod will be taken forward with great force to effect the blow.

The amount of this blow will depend upon the extent to which the spring 167 has been compressed as the rod 160 is retracted. Fixed to the rod 160 and extending laterally through an elongated slot 174 in the casing 158 is an indicating arm 175 that will register with numerical indications 176 on the outer face of the casing 158. Handles 177 and 178 extend respectively laterally from the sides of the casing 158. Either handle 177 or 178 can be used for supporting the device 156 while the knob is pulled or pushed to release the striking rod 160.

Referring now particularly to Figs. 13 to 22 inclusive, there is shown a more portable form of the invention. The parts of this form of the invention are so arranged that they can be extended into a common plane for the purpose of fitting the machine into a carrying case. This form of the device comprises generally feet members 180 and 181 which can be angled with respect to one another to either closed position upon one another or separated from one another to provide a support, a sleeve 182 in which a rod support 183 is vertically adjustable, cushion members 184 and 185 and an angularly adjustable top support member 186, a measuring device 187 and a goose neck 188 carrying a striking device 189.

The angularly adjustable support members 180 and 181 are formed of strap iron bent to provide depending legs and having intermediate portions slidable over one another. The uppermost base member 180 has an upstanding sleeve projection 190 and bosses 191 and 192 containing ball detents 193 and springs 194. Each ball 193 is urged toward a recess 195 in a boss 196 carried on the lower end of support sleeve 182, whereby to hold the foot member 180 against angular displacement. The sleeve support 182 has projection 198 that extends downwardly through an opening in the sleeve 190 and in the member 180 for securement with the foot member 181.

The vertically extending sleeve 182 has an elongated slot 199 in which is a clamping screw 200 that is carried by the adjustable rod support 183. When the clamping screw 200 is loosened, the rod support can be adjusted to any desired vertical position, and thereafter upon the clamping screw being tightened, it will be held fixed in its adjusted position.

Fixed upon the rod support 183 is a sleeve member 201 having clutch teeth 202 engageable by corresponding clutch teeth 203 of the angularly adjustable top support member 186. This top support member 186 can be lifted upon the rod support 183 so that its teeth 203 are disengaged from the teeth 202 of the fixed clutch member 201 in order to permit the angular adjustment of the support member 186 and of the measuring device 187 in order that it can be extended to the position shown in Fig. 13, or to a position shown in Fig. 22, as when the same is to be stored in a carrying case 204.

A handle 205 extends outwardly from the clutch member 201 and can be grasped while an adjustment of the adjustable support member or sleeve 186 is being effected. A laterally extending arm 206 extends outwardly from the angular adjustable support 186 and carries the measuring device 187.

This arm 206 has a serrated series of teeth 207 therein, Fig. 17, forming a rack with which a latch 208, pivoted on a sleeve body 209 of the measuring device 187, engages. When the latch 208 is raised, the measuring device can be adjusted in or out along the arm 207. The latch 208 is normally urged into engagement with the rack teeth 207 by a compression spring 210. The latch 208 depends through a slot 211 in the sleeve body 209. A cover formation 212 extends over the latch 208 and is formed on the sleeve body 209. A quadrant 213 extends upwardly from the sleeve body 209 and has measuring indicia 214 thereon over which an indicating arm 215 is adapted to move. The indicating arm 215 has an integral depending arm 216. The indicating arm 215 and the depending arm 216 are pivotly secured to the sleeve body 209 by a pivot pin 217. A slot 218 is provided in the sleeve body to allow the movement of the indicating and depending arms. A weight arm 219 is connected to the depending arm 216 and which may also serve as a handle to lift the depending arm 216 in order to permit the patient's limbs to be positioned rearwardly of the arm 216. Vertically adjustable on the arm 216 is a laterally extending contact member 220 and a head 221. The member 220 is pivotly connected to the head 221 as indicated at 222 in Fig. 21 so that the contact arm 220 can be laterally adjusted from one side to the other for engagement with either limb of the patient. Accordingly, after the measurement is taken from one of the limbs it can be swung across by simply elevating the arm 216 by means of the handle 219 and swinging the contact arm to the other side where it can be engaged by the other limb of the patient. A stop button 223 prevents the head 221 from sliding off the lower end of the arm 216.

The goose neck 188 is attached by a coupling member 224 to the upper end of the rod support 183.

The free end of the goose neck 188 carries a handle 225 to which the striking device 189 is secured.

The striking device 189 comprises a casing 226 of generally segmental shape but longer on one side than on the other. A leaf spring 227 is fixed by fastening elements 228 in the corner of the casing 226, Fig. 14, and its free end is adjustable along the side 229. A handle 230 is fixed to the free end of the spring 227 by which the spring can be elevated to a position as shown in Fig. 14. Upon release, the spring 227 moves downwardly to project its striking element 233 through a bottom slot 234 with great force and to effect a blow upon the nerve of the patient's limb with which the striking device is registered. An indicating projection 235 will move over the scale indicia 236 on the side of the casing 226.

The cushion elements 184 and 185 are respectively carried on bracket arms 237 and 238 that extend laterally from the fixed sleeve or clutch member 201 on the supporting rod 183, Fig. 22.

As seen in Fig. 22, the foot members 180 and 181 can be adjusted to lie parallel to one another in overlying relationship and the measuring device 187 can be angled to a position to extend over one of the cushion elements. The sleeve body 209 of the measuring device 187 can be moved inwardly along the supporting arm 206 and the contact member or arm 220 can be angled to a position to also lie parallel with the sleeve body 209 of the measuring device 187. The goose neck 188 is easily twisted to locate the striking device 189 above the cushion element 184 in the carrying case 204. It will thus be seen that the devices and the principal parts of the machine are placed in a common plane so that the machine can be easily disposed within carrying case 204.

In Figs. 23, one of the forms of the invention is shown set up to receive legs 237. The upper part of each leg 237 is rested upon cushion element 125 of the form of the invention shown in Fig. 8. Crank wheel 114 can be adjusted to locate the cushion element 125 in the proper elevated position for the leg 237. Measuring device 130 is adjusted on the laterally extending arm 128 to the proper position so that depending arm 146 can be angled by the lower part of the leg, as the leg is struck below the knee. Contact member 148 will extend over the front and lower end of the leg. As striking device 156 is lowered and its striking element 161 aligned with the nerve below the knee and released the reflex action of the nerve will cause the leg to be elevated so that the arm 146 will be angled and consequently indicator 143 will be brought over the scale indicia 144 and accordingly a reading can be taken. After the reading is taken for one leg, the arm 149 can be lowered at the opposite side of the measuring device, and a reading taken for the other leg.

In Fig. 24, there is shown the testing machine adapted for use in testing the reflexes of the foot. The lower leg is rested upon the cushion element 125 with the heel up and the toe down. The contact member 148 is elevated upon the arm 146 so as to be struck by the ball of the foot.

The striking device 156 is brought into alignment with the rear of the heel so that the striking element 161 will engage the nerve therein. The amount of reflex will be readily recorded by the rearward movement of the ball of the foot striking the contact member 148 to move the arm 146 rearwardly. An indication will be registered on the measuring device. The testing machine can be positioned alongside the bottom of a bed in order to conveniently locate the leg 237 thereon.

If it is desired to test the reflex action of the arm, the machine can be placed on an elevated surface so that the patient can hang his forearm 239 in the manner, as shown in Fig. 25, over the cushion element 125 so that the hand is extended downwardly. The contact member 148 will extend across the wrist and upon the rear of the elbow being struck by the device 156 a deflection in the measuring device 130 will be recorded. It should now be apparent that all forms of the invention can be readily adapted in order to measure the reflexes of either the leg, the foot or the forearm.

It should further be apparent that there has been provided in a reflex action testing machine an adjustable support in order that the operating parts can be elevated to the proper position and wherein certain of the parts can be adjusted relative to other parts in order that the patient can be more readily positioned relative to the machine; in the case of the last described form of the invention, the parts can be angled so that they can be embodied in a carrying case and made more portable. It should be further apparent that an easy adjustment can be made of the striking device which is mounted on the flexible goose neck so that it can be easily brought into position to effect a striking blow upon the limb of the patient. Thereafter, the striking device can be readily and quickly elevated to an out of use position and free of the patient's limb so that the limb can be made easily free of the machine.

While various changes may be made in the detail construction, it will be understood that such changes are within the spirit and scope of the appended claims.

I claim:

1. A machine for testing and measuring the reflex actions of a human, comprising a vertical support, means mounted thereon for supporting the limb of the human to be tested, a measuring device having an operating arm arrangement engageable with such limb to indicate the amount of the reflex action thereof, and a striking device adapted to engage the limb of a human with a pre-settable amount of striking force to effect the reflex action aforesaid, means for flexibly mounting said striking device upon the vertical support, a contact member forming a part of and adapted to extend laterally from the operating arm arrangement and means for adjustably positioning such contact member thereon.

2. A machine for testing and measuring the reflex actions of a human as defined by claim 1 in which the said operating arm arrangement includes a slide head, a contact member pivotally connected to the slide head and shiftable through an angle of 180° to adapt the measuring device for use with either limb.

3. A machine for testing and measuring the reflex actions of a human as defined by claim 1 in which said vertical support is provided with foot members which are angularly movable with respect to each other to bring them into overlying parallel relation and into extended relationship to constitute a support and detent means for holding said foot members in their angularly adjusted positions.

4. A reflex action testing and measuring machine for humans, as defined by claim 3, in which said supporting means includes cushion elements extending laterally outwardly from the opposite sides of said vertical support, said measuring device being movable angularly to a position over one of said cushion elements and said striking device being positionable over the other cushion element for storage and transportation within an associable carrying case.

5. A reflex action testing and measuring machine as defined by claim 1 in which said striking device includes a segmental shaped casing having an arcuate slot extending through the curved edge thereof and a leaf spring anchored at one end in the corner of such casing, said spring extending through said slot and having a handle member at the other end extending beyond the casing and a striking element actuated by said spring through a slot provided for that purpose in one side of such casing.

6. A machine for testing and measuring the reflex actions of human limbs which comprises, in combination, means for receiving and supporting a pair of such limbs in position to be tested, means for applying a pre-settable amount of striking force to either limb to evoke reflex action thereof and means for measuring the extent of the reflex action of either of such limbs resulting from the particular striking force employed.

7. A machine for testing and measuring the reflex actions of human limbs as defined by claim 6, in which the striking means and the measuring means are mounted centrally with respect to the limb supporting means and are positionable for use on either of the pair of limbs and for limbs of any proportions.

8. A machine for testing and measuring the reflex actions of human limbs as defined by claim 6, in which said limb supporting means includes a pair of lateral cushion elements between which is provided a vertical support for said striking and measuring means, said vertical support being interconnected with said limb supporting means.

9. In a machine for testing and measuring the reflex actions of human limbs, means for applying a pre-settable amount of striking force to such limbs to evoke reflex action thereof and means for measuring the extent of such reflex action produced by the particular striking force employed.

10. In a machine for testing and measuring the reflex actions of human limbs, means for applying a pre-settable amount of striking force to such limbs to evoke reflex action thereof and means for measuring the extent of such reflex action produced by such striking force employed, supports for said striking and measuring means and means for positioning and correlating said striking and measuring means and said supports for right and left limbs and limbs of various proportions.

References Cited in the file of this patent

FOREIGN PATENTS 44,018   Austria _____ Sept. 10, 1910